(12) United States Patent
Tramiel et al.

(10) Patent No.: US 12,028,787 B2
(45) Date of Patent: *Jul. 2, 2024

(54) USER-CONFIGURABLE SENSOR PLATFORM

(71) Applicant: Palo Alto Innovation, LLC, Santa Clara, CA (US)

(72) Inventors: Samuel Alexander Tramiel, Mountain View, CA (US); Dawid Bogdal, Sunnyvale, CA (US); Alexander Kreitz, Palo Alto, CA (US); Eugene Gershtein, Redwood City, CA (US); Darius Mostowfi, San Carlos, CA (US)

(73) Assignee: Palo Alto Innovation, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/216,293

(22) Filed: Mar. 29, 2021

(65) Prior Publication Data

US 2021/0219108 A1    Jul. 15, 2021

Related U.S. Application Data

(63) Continuation of application No. 16/240,760, filed on Jan. 6, 2019, now Pat. No. 10,966,068.

(51) Int. Cl.
*G06F 13/00* (2006.01)
*H04L 69/18* (2022.01)
(Continued)

(52) U.S. Cl.
CPC ............... *H04W 4/38* (2018.02); *H04L 69/18* (2013.01); *H04W 24/10* (2013.01);
(Continued)

(58) Field of Classification Search
CPC ... H04W 4/38; H04W 24/10; H04W 52/0274; H04W 80/045; H04W 88/04; H04W 84/18; H04W 4/80; H04L 69/18; Y02D 30/70
(Continued)

(56) References Cited

U.S. PATENT DOCUMENTS 5,963,650 A    10/1999  Simionescu et al.
6,847,892 B2   1/2005   Zhou et al.
(Continued)

OTHER PUBLICATIONS

Cypress Semiconductor Corp., "Cypress and Semtech Collaborate on Integrated LoRaWAN(TM) Solution for Smart City Applications," Jun. 6, 2018.

(Continued)

*Primary Examiner* — Kenneth R Coulter
(74) *Attorney, Agent, or Firm* — Huse IP Law; Charles C. Huse (57) ABSTRACT

A sensor platform includes a programmable microcontroller to execute programming associated with one or more sensors in order to receive data from the one or more sensors and generate reports based on the data, and to enter a power-down mode in the absence of the data. The sensor platform also includes first and second transceivers. The first transceiver is configured to establish wireless connectivity with user devices using a first wireless protocol and to receive the programming from one or more of the user devices using the first wireless protocol. The second transceiver is configured to transmit the reports to a gateway using a second wireless protocol that is lower power, longer range, and/or lower fidelity than the first wireless protocol.

7 Claims, 5 Drawing Sheets

(51) Int. Cl.
*H04W 4/38* (2018.01)
*H04W 24/10* (2009.01)
*H04W 52/02* (2009.01)
*H04W 80/04* (2009.01)
*H04W 88/04* (2009.01)

(52) U.S. Cl.
CPC ..... *H04W 52/0274* (2013.01); *H04W 80/045* (2013.01); *H04W 88/04* (2013.01)

(58) Field of Classification Search
USPC ........ 709/224, 223, 220–222, 217–219, 230, 709/232
See application file for complete search history.

(56) References Cited

U.S. PATENT DOCUMENTS

| | | | |
|---|---|---|---|
| 7,528,711 B2 | 5/2009 | Kates | |
| 7,806,337 B2 | 10/2010 | Pichardo et al. | |
| 8,217,789 B2 | 7/2012 | Script | |
| 8,223,013 B2 | 7/2012 | Kuris et al. | |
| 8,407,008 B2 | 3/2013 | Pavel et al. | |
| 9,596,025 B1 | 3/2017 | Rainnie et al. | |
| 10,204,498 B2 | 2/2019 | Trishaun | |
| 10,966,068 B2* | 3/2021 | Tramiel | H04W 24/10 |
| 2006/0197660 A1 | 9/2006 | Luebke et al. | |
| 2010/0100359 A1 | 4/2010 | Podoloff et al. | |
| 2010/0145479 A1 | 6/2010 | Griffiths | |
| 2010/0201515 A1 | 8/2010 | Fleming | |
| 2014/0350883 A1 | 11/2014 | Carter et al. | |
| 2017/0301220 A1 | 10/2017 | Jarrell et al. | |
| 2017/0366988 A1 | 12/2017 | Stamatakis et al. | |
| 2018/0102035 A1 | 4/2018 | Trishaun | |
| 2019/0347916 A1 | 11/2019 | Wild et al. | |
| 2019/0373472 A1* | 12/2019 | Smith | H04L 9/3239 |
| 2019/0392356 A1 | 12/2019 | Munir et al. | |

OTHER PUBLICATIONS

Cypress Semiconductor Corp., "PSoC(r) 6 MCU: PSoC 63 with BLE Datasheet," Jul. 17, 2018.
Holger, "Cypress PSoC 6 MCU Enters LoRaWAN TTN," Hacker.io, Dec. 19, 2017, 84e872 (downloaded Jan. 4, 2019).
Tony Rosati & Erik Wood, "End-To-End Secure LoRaWAN: Secure Devices with Key Management from Provisioning to Operations," Jun. 21, 2018 (Cypress Semiconductor Corp.).

* cited by examiner

USER-CONFIGURABLE SENSOR PLATFORM

RELATED APPLICATION

This application is a continuation of U.S. patent application Ser. No. 16/240,760, filed on Jan. 6, 2019, now U.S. Pat. No. 10,966,068, which is incorporated by reference in its entirety.

TECHNICAL FIELD

This disclosure relates to wireless sensors, and more specifically to user-configurable wireless sensors.

BACKGROUND

Consumer acceptance of wireless sensors is limited by a lack of convenient user-configurability. Sensor systems that are dedicated to a particular type of sensor are by definition limited in their use and lack universality. Expecting consumers to buy numerous different types of sensor systems is unreasonable.

Consumer acceptance of wireless sensors is also limited by poor battery life. If a user has to change or recharge the batteries in a wireless sensor frequently, the wireless sensor becomes a nuisance and the user is less likely to utilize it.

SUMMARY

According, there is a need for user-configurable wireless sensors that are low power and therefore have long battery lives.

In some embodiments, a sensor platform includes a programmable microcontroller to execute programming associated with one or more sensors in order to receive data from the one or more sensors and generate reports based on the data, and to enter a power-down mode in the absence of the data. The sensor platform also includes first and second transceivers. The first transceiver is configured to establish wireless connectivity with user devices using a first wireless protocol and to receive the programming from one or more of the user devices using the first wireless protocol. The second transceiver is configured to transmit the reports to a gateway using a second wireless protocol that is lower power, longer range, and/or lower fidelity than the first wireless protocol.

In some embodiments, a method of managing sensor operations is performed at a sensor platform that includes one or more sensors, a programmable microcontroller, a first transceiver, and a second transceiver. In the method, a wireless connection is established with a user device through the first wireless transceiver using a first wireless protocol. Programming associated with a first sensor is received from the user device through the first wireless transceiver using the first wireless protocol. The programming is configured for execution by the programmable microcontroller. The programmable microcontroller configures the first sensor in accordance with the programming and, after configuring the first sensor, receiving data from the first sensor. The programmable microcontroller generates reports based on the data in accordance with the programming and transmits the reports through the second wireless transceiver, using a second wireless protocol, to a gateway. The second wireless protocol is lower power, longer range, and/or lower fidelity than the first wireless protocol. The programmable microcontroller enters a power-down mode in response to an absence of data from the one or more sensors.

BRIEF DESCRIPTION OF THE DRAWINGS

For a better understanding of the various described implementations, reference should be made to the Detailed Description below, in conjunction with the following drawings.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
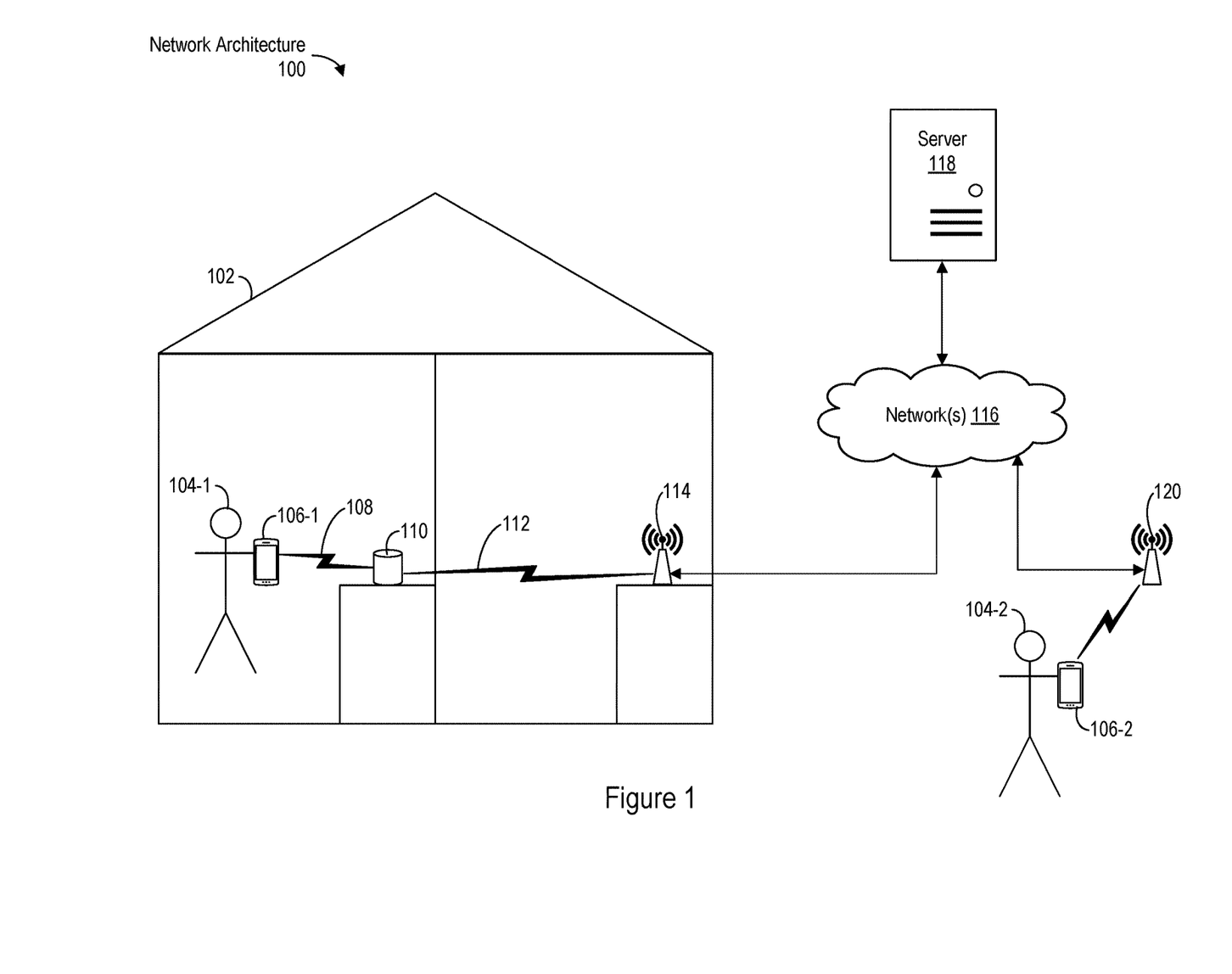
FIG. 1 shows a network architecture in which a sensor platform that houses one or more sensors is wirelessly communicatively coupled to a gateway in accordance with some embodiments.

FIG. 1 shows a network architecture 100 in which a sensor platform 110 that houses one or more sensors is wirelessly communicatively coupled to a gateway 114 in accordance with some embodiments. The sensor platform 110 may be located in a house 102 or other building. For example, the sensor platform 110 may be located in the premises of a business. Alternatively, the sensor platform 110 may be located in a vehicle or outdoors. While the gateway 114 is shown as being situated in the same house 102 (or other building) as the sensor platform 110, it may alternatively be situated in a different location from the sensor platform 110 (e.g., in a different house or other different building) (e.g., on a cellular tower, radio tower, or utility pole).

Sensors in the sensor platform 110 may be user-configurable. For example, a user 104-1 uses an application running on a user device 106-1 to configure one or more sensors in the sensor platform 110. To perform this configuration, the sensor platform 110 establishes a wireless connection 108 with the user device 106-1 using a first wireless protocol. In some embodiments, the first wireless protocol is a personal-area-network (PAN) protocol, such as Bluetooth Low Energy (BLE). The application then transmits configuration instructions to the sensor platform 110. For example, the user 104-1 uses the application to select a particular sensor recipe involving a particular sensor (or group of sensors), and the user device 106-1 transmits programming corresponding to the particular sensor recipe to the sensor platform 110. The particular sensor recipe that the user selects may be one of a plurality of recipes provided by the application (e.g., including multiple sensor recipes for the particular sensor and/or for different sensors). In some embodiments, the application allows the user 104-1 to create a sensor recipe (or multiple user-selectable sensor recipes). The user 104-1 may have one or more sensor recipes selected at a given time, such that programming corresponding to the selected recipe(s) is running on the sensor platform 110. The programming is configured for execution by a processor (e.g., a programmable microcontroller 402, FIG. 4) in the sensor platform 110. The processor executes the programming to enable operation of the particular sensor (or group of sensors). The user device 106-1 may be a mobile electronic device (e.g., mobile phone), wearable computing device, laptop computer, tablet computer, desktop computer, virtual assistant, or another suitable electronic device.

The sensor platform 110 wirelessly transmits reports to the gateway 114 via a wireless connection 112 that uses a second wireless protocol. In some embodiments, the second wireless protocol is a protocol for a low-power wide-area network (LPWAN). For example, the second wireless protocol may be LoRa. The second wireless protocol may be longer range, lower power, and/or lower fidelity than the first wireless protocol. The amount of data that can be transmitted during a given time period thus may be lower for the second wireless protocol than for the first wireless protocol, making the second wireless protocol unsuitable for sending programming corresponding to sensor recipes from the user device 106-1 to the sensor platform 110, but suitable for transmitting sensor data from the sensor platform 110 to the gateway 114. Alternatively, the second wireless protocol may be suitable for sending programming corresponding to sensor recipes, but substantially slower than the first wireless protocol. For example, a remote user device 106 of a remote user 104 may send the programming to the gateway 114, which forwards the programming to the sensor platform 110 using the second wireless protocol. In some embodiments, signals transmitted between the sensor platform 110 and the gateway 114 using the second wireless protocol have a range of 1-10 kilometers, while signals transmitted between the user device 106-1 and sensor platform 110 using the first wireless protocol have a range of approximately 100 meters or less (e.g., a range that limits the user device 106-1 and sensor platform 110 to being in the same house 102). In some embodiments, signals transmitted between the user device 106-1 and sensor platform 110 using the first wireless protocol are 2.4 GHz signals while signals transmitted between the sensor platform 110 and the gateway 114 using the second wireless protocol are sub-gigahertz signals. (In other embodiments, instead of using two different wireless protocols, a single wireless protocol may be used both to configure (e.g., send the programming to) the sensor platform 110 and to send the reports to the gateway 114.)

The relatively long signal range achieved by the sensor platform 110 through the use of the second wireless protocol (e.g., LoRa) allows the gateway 114 to be situated in a different location that the sensor platform 110, as discussed above. For example, the gateway 114 may be located in a first building of an apartment complex, while the sensor platform 110 may be located in a second building of the apartment complex. In another example, the gateway 114 and sensor platform 110 may be located in different houses in the same neighborhood. In yet another example, the gateway 114 may be located in a building, while the sensor platform 110 may be located in a vehicle that operates in a region (e.g., neighborhood) around the building. Many other examples are possible.

The reports transmitted by the sensor platform 110 to the gateway 114 may include raw sensor data and/or sensor data as processed by the sensor platform 110. For example, a report may be triggered by new data being available from a sensor (e.g., because a parameter monitored by the sensor has crossed a threshold, such that a detection threshold of the sensor has been satisfied) and may include the new data. Alternatively, or in addition, a report may include one or more statistics, as calculated by the processor, about sensor data. For example, the report may include an average value (e.g., mean, median, or mode) measured by a sensor during a time period.

In some embodiments, the gateway 114 forwards the reports through one or more networks 116 to a remote server 118. The remote server 118 may be associated with (e.g., operated and/or controlled by the provider of) the application on the user device 106-1 that was used to configure the one or more sensors in the sensor platform 110. Reports may be stored (e.g., by the sensor platform 110, gateway 114, and/or remote server 118) and subsequently accessed by user devices 106 (e.g., by instances of the application running on respective user devices 106). The gateway 114 may receive reports from multiple sensor platforms 110 (e.g., within the same house 102 or other building, within a group of buildings, or otherwise situated within range of the gateway 114) and forward those reports to the remote server 118. For example, the gateway 114 may function like a wireless router. In some embodiments, however, the gateway 114 is separate from a wireless router (not shown) in the house 102 (or other building) that provides wireless network access (e.g., access to a local area network, such as WiFi access) to electronic devices such as the user device 106-1. Alternatively, the gateway 114 may be integrated with such a wireless router. In yet another example, the gateway 114 may be integrated in a cellular base station.

The one or more networks 116 may include any network or combination of networks, such as the Internet, other wide area networks (WAN), metropolitan area networks (MAN), local area networks (LAN), virtual private networks (VPN), peer-to-peer networks, and/or ad-hoc connections. The one or more networks 116 may include public communication networks, private communication networks, or a combination of both public and private communication networks.

In some embodiments, the remote server 118 receives the reports from gateways 114, stores and processes the reports, and generates notifications to be sent to user devices 106 to notify users 104 of sensor readings. Examples of notifications include, without limitation, SMS messages, emails, and phone messages (e.g., automated text-to-speech messages or pre-recorded voice messages). In the example of FIG. 1, the remote server 118 may send notifications to the user device 106-1 of the user 104-1 and/or to a different user device 106-2 of a different user 104-2. A notification may be sent to the user device 106-2 of the user 104-2 through one or more networks 116 and a wireless access point 120 (e.g., a WiFi access point, cellular base station, etc.) that is in a different location than the building 102. Notifications thus may be sent to user devices 106 of one or more users 104 regardless of their current locations.

The notifications may include data from one or more reports as processed by the sensor platform 110. For example, a notification may be triggered by new data being available from a sensor (e.g., because a detection threshold of the sensor has been satisfied) and may include the new data, as sent from the sensor platform 110 to the remote server 118 in a report. Alternatively, or in addition, a notification may include one or more statistics, as calculated by the sensor platform 110 and/or the remote server 118. For example, a notification may include an average value (e.g., mean, median, or mode) measured by a sensor during a time period. In still another example, a report may indicate that an issue exists with a sensor (e.g., provide a warning regarding a sensor, such as an indication that a detection threshold has been satisfied), with or without including data. Notifications may also or alternatively include information regarding the health status of the sensor platform 110 (e.g., battery-life indications, indications as to whether the sensor platform 110 is functioning, indications as to whether particular sensors and/or other components are functioning, etc.).

The notifications may be user-configurable. For example, the user 104-1 and/or the user 104-2 may use an application (e.g., the same application used to configure the sensor platform 110, or a different application) running on a respective user device 106-1 and/or 106-2 to specify the type of content and/or format for notifications corresponding to a respective sensor (or group of sensors). The user 104-1 and/or the user 104-2 may use the application to specify one or more conditions under which notifications are to be generated and sent. The type of content, format, and/or conditions may be specified in a particular sensor recipe, such that selecting a sensor recipe results in both configuration of the sensor platform 110 and configuration of the remote server 118 regarding notifications. For example, selection of a sensor recipe on the user device 106-1 may cause a first message to be sent to the sensor platform 110 using the first wireless protocol to enable a sensor or group of sensors and configure the sensor platform 110 accordingly, and a second message to be sent to the remote server 118 (e.g., through the gateway 114 or a wireless access point) to configure notifications associated with the sensor or group of sensors. The user device 106-1 may send the second message using a wireless protocol distinct from both the first and second protocols (e.g., using WiFi), or alternatively using the first wireless protocol.

The network architecture 100 is merely an example of a network architecture for a sensor platform. Other examples are possible. For example, the remote server 118 may be omitted and notifications may be provided to users in a different manner (e.g., may be generated and transmitted by the gateway 114).

Figure 2A:
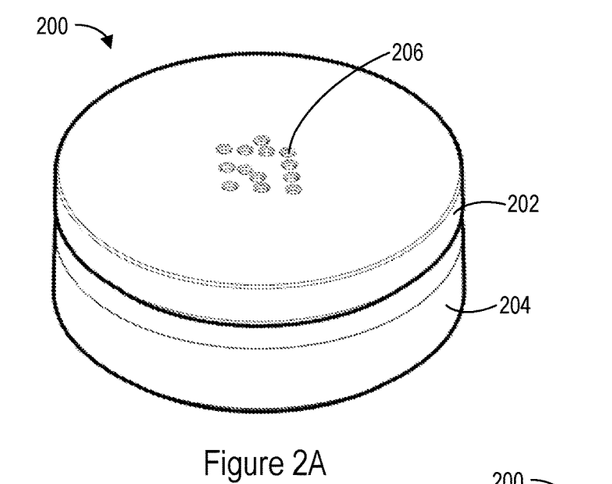
FIGS. 2A-2C show an example of the sensor platform of FIG. 1 in accordance with some embodiments.

FIG. 2A shows a sensor platform 200 that is an example of the sensor platform 110 (FIG. 1), in accordance with some embodiments. The sensor platform 200 includes a first portion 202 mechanically coupled (e.g., screwed) to a second portion 204. In some embodiments, the first portion 202 houses sensors and the second portion 204 houses batteries.

In some embodiments, the first portion 202 includes holes 206 through its exterior (e.g., on a top surface). The holes 206 provide sensors in the sensor platform 200 with access to the environment outside of the sensor platform 200. In some embodiments, respective sensors and/or transmitters within the sensor platform 200 may be configured to extend through respective holes 206 and to retract back into the sensor platform 200 when not in use.

Figure 2B:
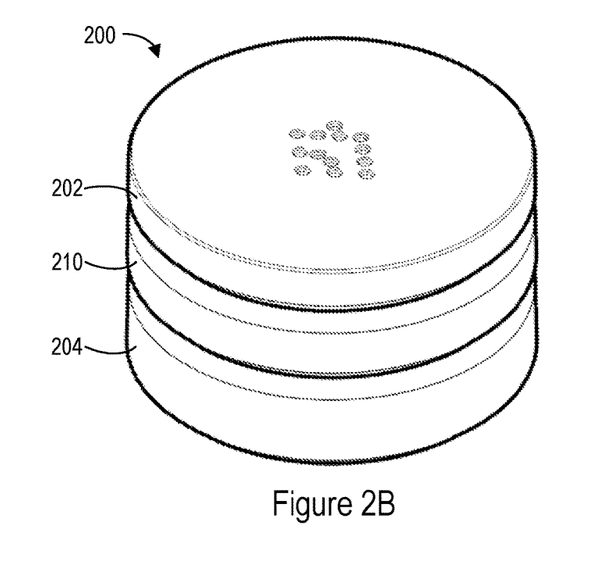

A user 106 may mechanically de-couple (e.g., unscrew) the first portion 202 from the second portion 204 and add one or more expansion modules 210 between the first portion 202 and the second portion 204. For example, as shown in FIG. 2B in accordance with some embodiments, a single expansion module 210 may be added between the first portion 202 and the second portion 204, such that the expansion module 210 is mechanically coupled to (e.g., screwed to) both the first portion 202 and the second portion 204. In another example (not shown), a stack of multiple expansion modules 210 may be added between the first portion 202 and the second portion 204. Successive expansion modules 210 in the stack may be mechanically coupled to (e.g., screwed to) each other, with the top expansion module 210 in the stack being mechanically coupled to (e.g., screwed to) the first portion 202 and the bottom expansion module 210 in the stack being mechanically coupled to (e.g., screwed to) the second portion 204.

Figure 2C:
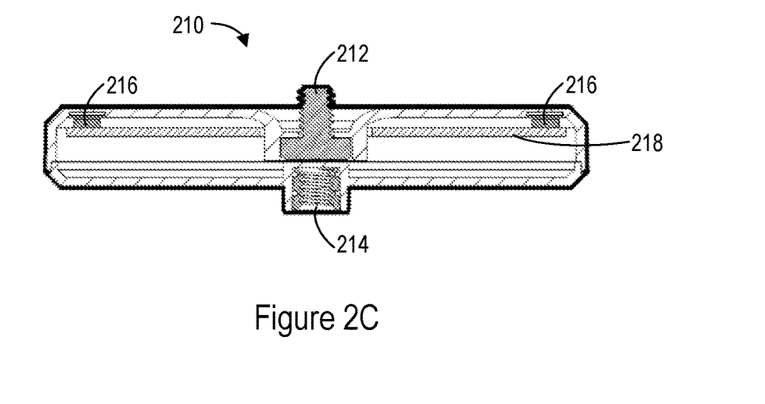

FIG. 2C shows a cross-section of an expansion module 210 in accordance with some embodiments. A screw 212 is used to mechanically couple the expansion module 210 to an expansion module 210 above it or to the top portion 202. A screw hole 214 is used to mechanically couple the expansion module 210 to an expansion module 210 below it or to the bottom portion 204. The expansion module 210 contains an expansion board 218 on which one or more sensors and/or transceivers (not shown) are mounted. Electrical contacts 216 communicatively couple the one or more sensors and/or transceivers on the expansion board 218 to an overlying expansion board 218 or to the top portion 202. Similar electrical contacts (not shown) may provide an electrical connection to an underlying expansion board and/or the second portion 204.

FIGS. 2A-2C are merely one example of how to add expansion boards and corresponding sensors and/or transceivers to a sensor platform 110. Other examples are possible. For example, a sensor platform 110 may have one or more slots into which respective expansion boards may be inserted.

Figure 3:
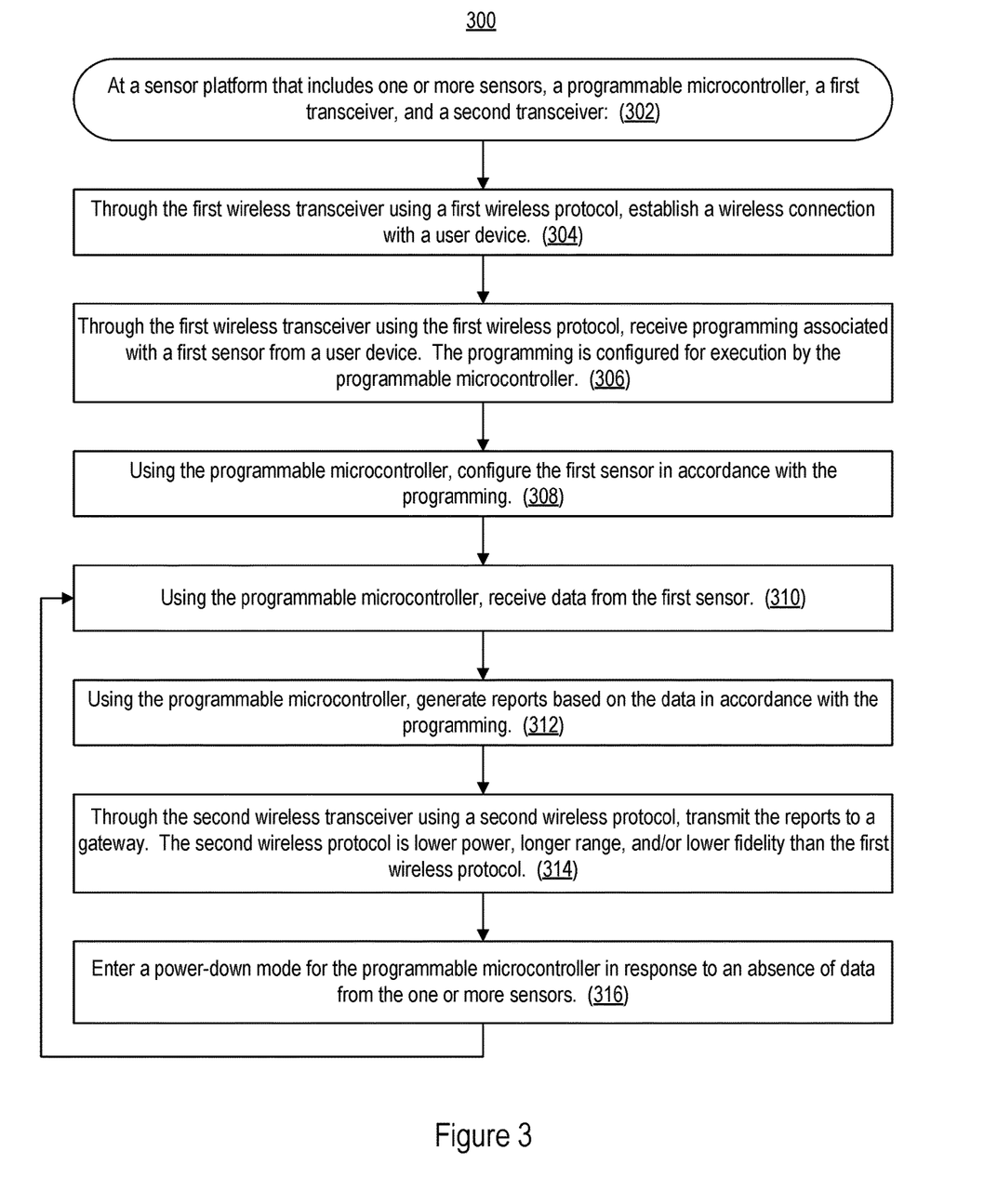
FIG. 3 is a flowchart illustrating a method of managing sensor operations in accordance with some embodiments.

FIG. 3 is a flowchart illustrating a method 300 of managing sensor operations in accordance with some embodiments. The method 300 is performed at (302) a sensor platform (e.g., the sensor platform 100, FIG. 1, such as the sensor platform 200, FIG. 2; the sensor platform 400, FIG. 4) that includes one or more sensors, a programmable microcontroller, a first transceiver, and a second transceiver.

In the method 300, a wireless connection is established (304) with a user device (e.g., user device 106-1, FIG. 1). The wireless connection is established through the first wireless transceiver using the first wireless protocol.

Programming associated with a first sensor is received (306) from the user device through the wireless connection. The programming is thus received through the first wireless transceiver using the first wireless protocol. The programming is configured for execution by the programmable microcontroller.

The programmable microcontroller configures (308) the first sensor in accordance with the programming (e.g., as part of executing the programming).

After configuring the first sensor, the programmable microcontroller receives (310) data from the first sensor. In some embodiments, when new data is available from the first sensor (e.g., when a value of a parameter measured by the first sensor satisfies a threshold, such as a user-configurable threshold), the first sensor sends an interrupt to the programmable microcontroller, which then reads the data. In some embodiments, the programmable microcontroller polls the first sensor at specified times (e.g., periodically) to obtain new data.

The programmable microcontroller generates (312) reports based on the data, in accordance with the programming (e.g., as part of executing the programming). In some embodiments, a report is generated in response to new data from the first sensor. In some embodiments, a report is generated based on multiple data points from the first sensor (e.g., as measured over a specified period of time). For example, reports may be generated periodically.

The reports are transmitted (314) through the second wireless transceiver, using the second wireless protocol, to a gateway (e.g., gateway 114, FIG. 1, which forwards the reports to the remote server 118). The second wireless protocol is lower power, longer range, and/or lower fidelity than the first wireless protocol.

The programmable microcontroller enters (316) a power-down mode in response to an absence of data from the one or more sensors. For example, the programmable microcontroller powers down, in whole or in part, in the absence of interrupts from the one or more sensors and/or when not polling any of the one or more sensors, such that the programmable microcontroller is not receiving or processing data (e.g., is not generating or transmitting any reports).

In some embodiments of the method 300, the first sensor is mounted on a first expansion board. The sensor platform mechanically receives the first expansion board before configuring (308) the first sensor. In this manner, the first sensor becomes one or the "one or more sensors" of steps 302 and 316. The sensor platform may mechanically receive a second expansion board on which a second sensor is mounted. In this manner, the second sensor becomes one of the "one or more sensors" of steps 302 and 316. In some embodiments, the first expansion board is removed and replaced with the second expansion board. In other embodiments, the second expansion board is mechanically received by the sensor platform, and thus installed in the sensor platform, while the first expansion board is installed in the sensor platform (i.e., remains received by the sensor platform). Equivalents of steps 304-314 or a portion thereof are performed for the second sensor.

In some embodiments of the method 300, the first sensor is fixedly attached to the sensor platform (e.g., fixedly mounted inside the sensor platform), and thus is not removable and replaceable (at least, not without damaging the sensor platform).

The use of separate wireless protocols to configure the sensor platform and report sensor data in the method 300 allows for easy user-configurability along with long battery life. A low-power second wireless protocol allows the sensor platform to report sensor data for an extended period of time (e.g., months) without exhausting its batteries. A higher power, higher fidelity first wireless protocol allows for quick configuring and updating of the sensor platform. Because such configuration and updating is typically infrequent, battery life is not significantly impacted. Furthermore, the availability of expansion boards in some embodiments increases the options for user configurability.

Figure 4:
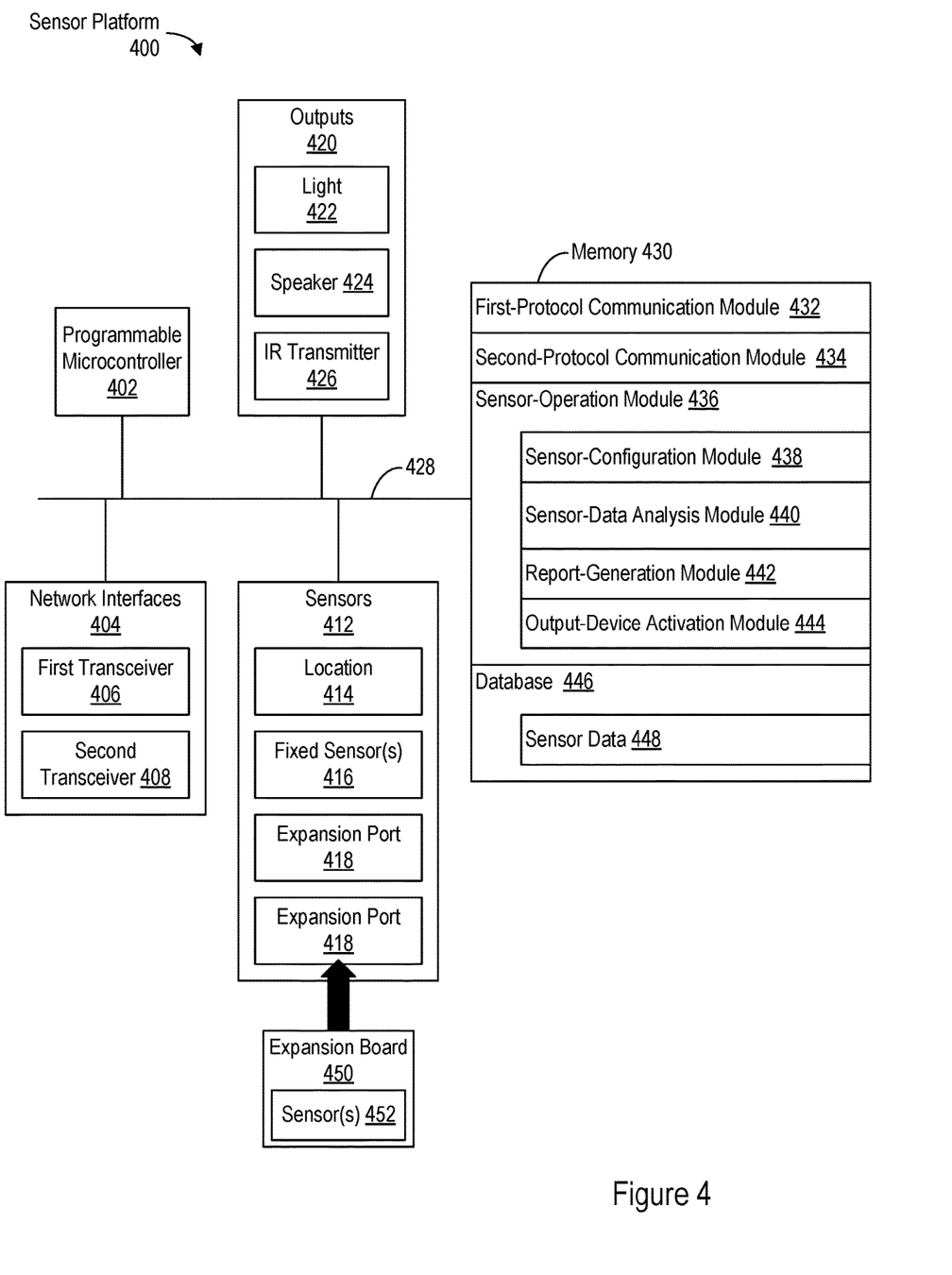
FIG. 4 is a block diagram of a sensor platform in accordance with some embodiments.

FIG. 4 is a block diagram of a sensor platform 400 in accordance with some embodiments. The sensor platform 400 is an example of the sensor platform 110 (FIG. 1), such as the sensor platform 200 (FIGS. 2A-2C). The sensor platform 400 includes a programmable microcontroller 402, a plurality of wireless network interfaces 404, one or more sensors 412, one or more outputs 420, memory 430, and one or more communication buses 428 interconnecting these components. In some embodiments, the programmable microcontroller 402 is a programmable system on a chip (e.g., a PSoC® from Cypress Semiconductor Corporation). In some embodiments, the memory 430 or a portion thereof (e.g., including nonvolatile memory) is integrated with (e.g., situated on the same chip as) the programmable microcontroller 402. In some embodiments, one or more of the wireless network interfaces 404 is integrated with (e.g., situated on the same chip as) the programmable microcontroller 402. The plurality of wireless network interfaces 404 may include a first transceiver 406 for the first wireless protocol and a second transceiver 408 for the second wireless protocol. In some embodiments, the first transceiver 406 is integrated with the programmable microcontroller 402 and the second transceiver 408 is on a different chip.

The one or more sensors 412 may include a location sensor 414 for determining a location of the sensor platform 400. The location sensor 414 may use one or more global navigation satellite systems (GNSSs, such as GPS, GLONASS, Galileo, or BeiDou) and/or trilateration of wireless signal strengths. The location sensor 414 may be fixedly situated within the sensor platform 400 or available on an expansion board 450.

The one or more sensors 412 may include one or more fixed sensors 416 that are fixedly situated within (e.g., mounted inside) or otherwise fixedly attached to the sensor platform 400. In addition to or as an alternative to the location sensor 414 and/or fixed sensors 416, the sensor platform 400 may include one or more expansion ports 418, each of which may receive an expansion board 450 (e.g., an expansion board 218 in an expansion module 210, FIG. 2) on which are mounted one or more sensors 452. Each expansion board 450 is removable from the expansion port(s) 418 and may be replaced in an expansion port 418 with another expansion board 450 (e.g., with different sensor(s) 452).

Examples of sensors 412 include, without limitation, the location sensor 414, a scale (e.g., a load cell), a proximity detector, a motion detector, a distance detector, an accelerometer, a capacitive-touch sensor, a leak detector, a motion detector, a temperature sensor, a humidity sensor, an air-quality detector, a microphone, a visible light detector, an ultraviolet (UV) light detector, an infrared (IR) light detector, a color detector, a compass, a food detector, a total dissolved solids (TDS) detector, a pH detector, and a sensor to detect breaking glass. Each of these examples may be a fixed sensor 416 or a sensor 452 provided on an expansion board 450.

In some embodiments, the fixed sensors 416 are or include the follow sensors, or a portion thereof: an accelerometer, a capacitive-touch sensor, a leak detector, a motion detector, a temperature sensor, a humidity sensor, a microphone, and a light detector.

In some embodiments, an expansion board received in an expansion port 418 includes a wireless transceiver to allow the sensor platform 400 to communicate wirelessly using a wireless protocol (e.g., WiFi, Zigbee, Zwave, Sigfox, a cellular protocol such as 4G/LTE or 5G, etc.) distinct from the first and second wireless protocols. In some embodiments, an expansion board received in an expansion port 418 includes a wire-line transceiver (e.g., for Ethernet or another wire-line protocol) and corresponding cable connector. The expansion board may include the transceiver(s) instead of or in addition to one or more sensors 452. A corresponding network communication module may be stored in the memory 430 (e.g., may be downloaded from the application running on the user device 106-1 or from the remote server 118, FIG. 1).

In some embodiments, the sensor platform 400 includes one or more outputs 420, including without limitation a light 422 (e.g., a light-emitting diode (LED)), speaker 424, and/or infrared (IR) transmitter 426. Each output 420 may be activated in response to sensor data. The programmable microcontroller 402 may execute programming (e.g., as received from the user device 106-1, FIG. 1) to activate one or more of the outputs 420 in response to a determination that data for a sensor 412 satisfies a criterion (e.g., a threshold, which may be user-configurable). For example, the light 422 may be activated as a warning and/or the speaker 424 may be activated to play a warning sound or message. In another example, the IR transmitter 426 may transmit a control signal to another electronic device (e.g., a device for playing media, such as a television, Blu-Ray/ DVD player, set-top box, video/audio streaming device, audio receiver/amplifier, etc.) in response to detection of a corresponding user gesture (e.g., a touch gesture made by a user on an exterior surface of the sensor platform 400, as detected by a capacitive touch sensor; a gesture made in the air by a user, as detected by a motion detector). More generally, the programming may instruct the programmable microprocessor 402 to perform respective operations in response to respective detected gestures (e.g., touch gestures; air gestures).

Furthermore, one or more of the outputs 420 (e.g., the light 422 and/or the speaker 424) may be activated in response to a determination that data for a sensor in another sensor platform satisfies a criterion. For example, outputs 420 on multiple (e.g., all) sensor platforms 400 in a specified region (e.g., within a house 102 or other building) may be activated (e.g., as a warning) in response to a determination that data for a sensor in one of the sensor platforms 400 in the specified region satisfies a criterion. In some embodiments, the instructions for such output activation on multiple sensor platforms 400 are provided by the remote server 118 or the gateway 114.

Memory 430 includes volatile and/or non-volatile memory. Memory 430 (e.g., the non-volatile memory within memory 430) includes a non-transitory computer-readable storage medium. Memory 430 optionally includes one or more storage devices remotely located from the programmable microcontroller 402 and/or a non-transitory computer-readable storage medium that is removably inserted into the sensor platform 400. In some embodiments, memory 430 (e.g., the non-transitory computer-readable storage medium of memory 430) stores the following modules and data:

- a first network communication module 432 that is used for communications between the sensor platform 400 and other computing devices (e.g., the first user device 106-1, FIG. 1) via the first transceiver 406, using the first wireless protocol;
- a second network communication module 434 that is used for communications between the sensor platform 400 and other computing devices (e.g., the gateway 114, FIG. 1) via the second transceiver 408, using the second wireless protocol;
- a sensor-operation module 436, which may include a sensor-configuration module 438 for configuring the sensors 412 (e.g., in accordance with programming received from the user device 106-1, FIG. 1), a sensor-data analysis module 440 for analyzing data received from the sensors 412 (e.g., for calculating statistics), a report-generation module 442 to generate the reports sent to the gateway 114 (e.g., to the remote server 118 through the gateway 114), and an output-device activation module 444 to activate the outputs 420 as described above (e.g., in accordance with programming received from the user device 106-1, FIG. 1); and
- a database 446 that stores sensor data 448.

The sensor-operation module 436 may include the programming received from the user device 106-1 (FIG. 1). The memory 430 (e.g., the first and second network communication modules 432 and 434 together with the sensor-operation module 436) includes instructions for performing the method 300 (FIG. 3) or a portion thereof.

Each of the modules stored in the memory 430 corresponds to a set of instructions for performing one or more functions described herein. Separate modules need not be implemented as separate software programs. The modules and various subsets of the modules may be combined or otherwise re-arranged. In some embodiments, the memory 430 stores a subset or superset of the modules and/or data structures identified above.

In some embodiments, the sensor platform 400 is battery powered. Alternatively, the sensor platform 400 may be powered by a DC power supply (internal or external) that connects to an AC source (e.g., electrical mains). In some embodiments, an expansion board may provide a connector for connecting to an external power supply.

FIG. 4 is intended more as a functional description of the various features that may be present in a sensor platform than as a structural schematic. In practice, items shown separately could be combined and some items could be separated.

Figure 5:
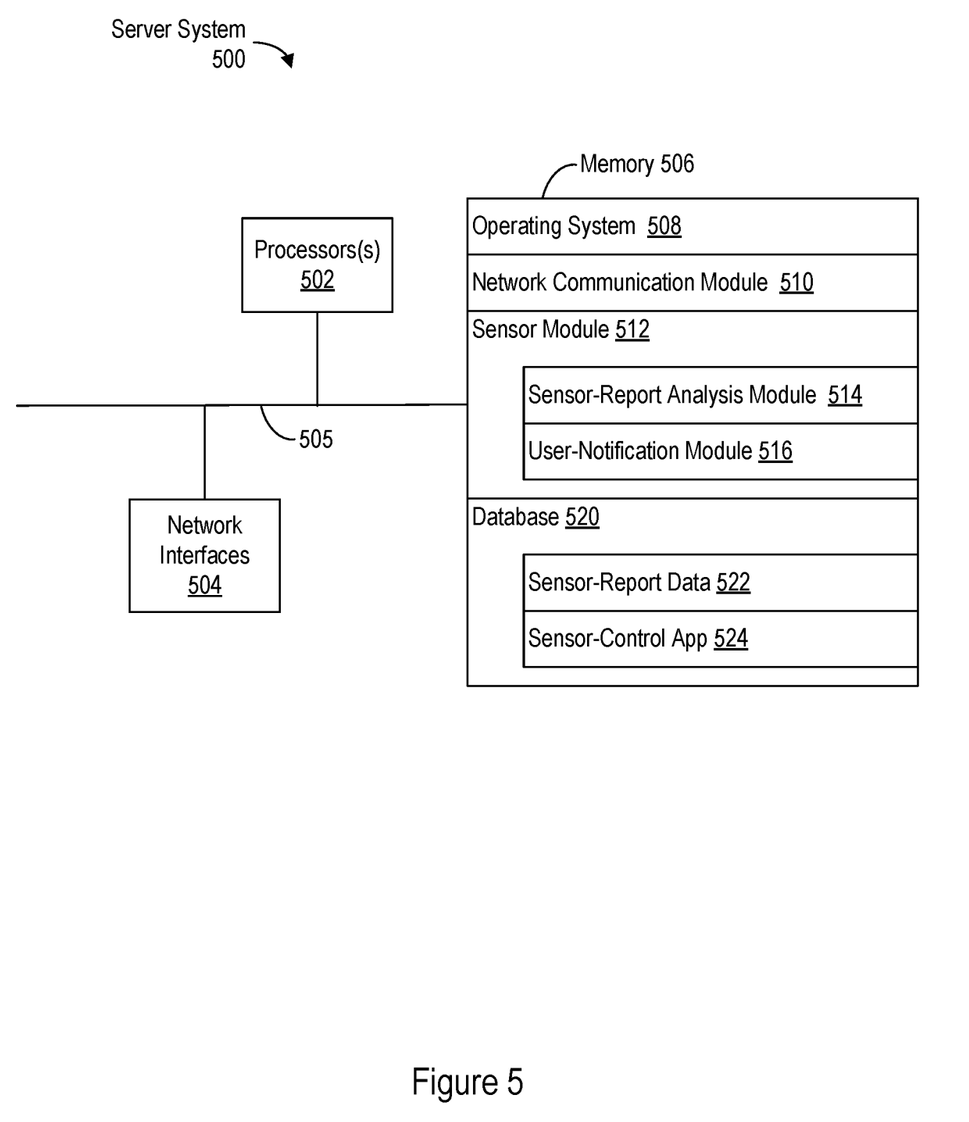
FIG. 5 is a block diagram of a server system in accordance with some embodiments.

FIG. 5 is a block diagram of a server system 500 in accordance with some embodiments. The server system 500 is an example of the remote server 118 (FIG. 1). The server system 500 typically includes one or more processors 502 (e.g., CPUs and/or GPUs), one or more network interfaces 504 (wired and/or wireless), memory 506, and one or more communication buses 505 interconnecting these components.

Memory 506 includes volatile and/or non-volatile memory. Memory 506 (e.g., the non-volatile memory within memory 506) includes a non-transitory computer-readable storage medium. Memory 506 optionally includes one or more storage devices remotely located from the processors 502 and/or a non-transitory computer-readable storage medium that is removably inserted into the server system 500. In some embodiments, memory 506 (e.g., the non-transitory computer-readable storage medium of memory 506) stores the following modules and data:

- an operating system 508 that includes procedures for handling various basic system services and for performing hardware-dependent tasks;
- a network communication module 510 that is used for connecting the server system 500 to other computing devices via one or more network interfaces 504 connected to one or more networks 116 (FIG. 1);
- a sensor module 512, which may include a sensor-report analysis module 514 for analyzing the reports received from sensor platforms 110 via gateways 114 and the one or more networks 116 (FIG. 1), and a user-notification module 516 for generating and sending the notifications to users (e.g., to the user devices 106-1 and/or 106-2, FIG. 1) based on the data in the reports; and
- a database 520 that stores data 522 from the reports received from sensor platforms 110 and a sensor-control application 524 (e.g., the application used by the user device 106-1 to configure the sensor platform 110, FIG. 1) that may be downloaded by user device 106. The sensor-control application 524 may include and/or allow for the creation of sensor recipes.

Each of the modules stored in memory 506 corresponds to a set of instructions for performing one or more functions described herein. Separate modules need not be implemented as separate software programs. The modules and various subsets of the modules may be combined or otherwise re-arranged. In some embodiments, memory 506 stores a subset or superset of the modules and/or data structures identified above.

FIG. 5 is intended more as a functional description of the various features that may be present in a server system than as a structural schematic. In practice, items shown separately could be combined and some items could be separated. For example, some items shown separately in FIG. 5 could be implemented on a single server and single items could be implemented by one or more servers. The actual number of servers used to implement the server system 500, and how features are allocated among them, will vary from one implementation to another.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of managing sensor operations, comprising, at a sensor platform comprising one or more sensors, a programmable microcontroller, a first transceiver, and a second transceiver:
through the first transceiver using a first wireless protocol, establishing a wireless connection with a user device;
through the first transceiver using the first wireless protocol, receiving from the user device programming associated with a first sensor of the one or more sensors, the programming being configured for execution by the programmable microcontroller;
by the programmable microcontroller, configuring the first sensor in accordance with the programming;
by the programmable microcontroller, after configuring the first sensor, receiving first data from the first sensor;
by the programmable microcontroller, generating reports based on the first data in accordance with the programming;
through the second transceiver using a second wireless protocol, transmitting the reports to a gateway, wherein the second wireless protocol is lower power and longer range than the first wireless protocol; and
by the programmable microcontroller, entering a power-down mode in response to an absence of second data from the one or more sensors, wherein the second data from the one or more sensors comprises the first data.

2. The method of claim 1, wherein:
the first wireless protocol is a protocol for a personal area network (PAN); and
the second wireless protocol is a protocol for a low-power wide-area network (LPWAN).

3. The method of claim 1, wherein:
the first transceiver transmits at 2.4 GHz; and
the second transceiver transmits at sub-gigahertz frequencies.

4. The method of claim 1, wherein the first sensor is fixedly attached to the sensor platform.

5. The method of claim 1, wherein the first sensor is selected from the group consisting of an accelerometer, a capacitive-touch sensor, a load cell, a leak detector, a motion detector, a temperature sensor, a humidity sensor, a microphone, and a light detector.

6. The method of claim 1, wherein the first sensor is selected from the group consisting of a scale, a proximity detector, a motion detector, a distance detector, an accelerometer, a capacitive-touch sensor, a leak detector, a motion detector, a temperature sensor, a humidity sensor, an air-quality detector, a microphone, a visible light detector, an ultraviolet (UV) light detector, an infrared (IR) light detector, a color detector, a compass, a location sensor, a food detector, a total dissolved solids (TDS) detector, a pH detector, and a sensor to detect breaking glass.

7. The method of claim 1, wherein:
the first sensor is a capacitive touch sensor to detect touch gestures made on an exterior surface of the sensor platform; and
the method further comprises, by the programmable microcontroller, performing respective operations in response to detection of respective touch gestures on the exterior surface by the capacitive touch sensor.

* * * * *